(12) United States Patent
Saika et al.

(10) Patent No.: US 8,788,667 B2
(45) Date of Patent: Jul. 22, 2014

(54) COMPUTER SYSTEM AND MANAGEMENT METHOD

(75) Inventors: Nobuyuki Saika, Yokosuka (JP); Sadahiro Nakamura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 771 days.

(21) Appl. No.: 12/510,051

(22) Filed: Jul. 27, 2009

(65) Prior Publication Data
US 2010/0293279 A1   Nov. 18, 2010

(30) Foreign Application Priority Data
May 15, 2009  (JP) ................. 2009-119219

(51) Int. Cl.
G06F 15/173 (2006.01)
H04L 29/08 (2006.01)
H04L 29/06 (2006.01)

(52) U.S. Cl.
CPC .......... H04L 29/08144 (2013.01); H04L 29/06 (2013.01)
USPC ......................................... 709/226; 709/223

(58) Field of Classification Search
CPC ......................... H04L 29/08144; H04L 29/06
See application file for complete search history.

(56) References Cited

U.S. PATENT DOCUMENTS

| 7,269,696 B2 | 9/2007 | Muhlestein et al. | |
| 2006/0195715 A1* | 8/2006 | Herington | 714/4 |
| 2008/0040483 A1* | 2/2008 | Nakatani et al. | 709/226 |
| 2008/0235350 A1 | 9/2008 | Nakamura et al. | |
| 2009/0077201 A1* | 3/2009 | Nakamura et al. | 709/219 |
| 2010/0205395 A1* | 8/2010 | Srinivasan | 711/170 |

FOREIGN PATENT DOCUMENTS

| JP | 2003-223346 | 8/2003 |
| JP | 2008-234568 | 10/2008 |

* cited by examiner

*Primary Examiner* — Liangche A Wang
*Assistant Examiner* — Suraj Joshi
(74) *Attorney, Agent, or Firm* — Foley & Lardner LLP

(57) ABSTRACT

Proposed are a computer system and a management method capable of localizing influence from a failure of a physical node and preventing influence from the physical node failure from spreading. This computer system includes one or more servers that respectively provide a different single namespace to a client, a plurality of physical nodes that are capable of executing a plurality of virtual nodes that respectively belong to one of the single namespaces and provide a file sharing service to the client, and a management apparatus for managing the virtual nodes, and executes control of calculating a degree of contribution to a user for each of the virtual nodes, and selecting the virtual node to be migrated and the physical node of a migration destination so as to average, among the physical nodes, a total value of the degree of contribution of each of the virtual nodes running on the physical nodes based on the degree of contribution to the user for each of the virtual nodes, and migrating the virtual node selected as the migration target to the physical node selected as the migration destination.

10 Claims, 24 Drawing Sheets

FIG.4

| DIRECTORY PATH NAME | iNODE NUMBER |
|---|---|
| /home/user-01/・・・/a.txt | 100 |
| /home/user-02/・・・/b.txt | 200 |
| ⋮ | ⋮ |

61A  61B  61

<SUPPLEMENTARY EXPLANATION>
Abbreviation: u → user, g → group, o → other (non-user)
Abbreviation: r → read, x → execute, w → write

| DIRECTORY PATH NAME | HOST NAME | FILE SYSTEM NAME | iNODE NUMBER |
|---|---|---|---|
| /b.txt | NAS-1 | FS11 | 200 |
| /Holder-1/d.txt | NAS-2 | FS21 | 501 |
| /Holder-2/a.txt | NAS-3 | FS31 | 1000 |
| /Holder-1/Holder-11/c.txt | NAS-3 | FS32 | 1001 |

FIG.11

| GNS NAME | NAS NAME |
|---|---|
| COMPANY A GNS | NAS-11 |
| COMPANY A GNS | NAS-21 |
| COMPANY A GNS | NAS-41 |
| COMPANY A GNS | NAS-71 |
| COMPANY B GNS | NAS-22 |
| ⋮ | ⋮ |

| NAS NAME | VIRTUAL NAS NAME |
|---|---|
| NAS-B | NAS-21 |
| NAS-B | NAS-22 |
| NAS-A | NAS-11 |
| ⋮ | ⋮ |

| NAS NAME | MULTIPLICITY | GNS NAME |
|---|---|---|
| NAS-B | 2 | COMPANY A GNS, COMPANY B GNS |
| NAS-D | 2 | COMPANY A GNS, COMPANY C GNS |
| NAS-G | 3 | COMPANY A GNS, COMPANY B GNS, COMPANY C GNS |
| ⋮ | ⋮ | ⋮ |

| NAS NAME | MULTIPLICITY | VIRTUAL NAS NAME | DEGREE OF CONTRIBUTION |
|---|---|---|---|
| NAS-A | 1 | NAS-11 | 8 |
| NAS-B | 2 | NAS-21 | 10 |
|  |  | NAS-22 | 5 |
| NAS-C | 1 | NAS-31 | 7 |
| NAS-D | 2 | NAS-41 | 15 |
|  |  | NAS-42 | 30 |
| NAS-E | 1 | NAS-51 |  |
| NAS-F | 0 | - | - |
| NAS-G | 3 | NAS-71 | 104 |
|  |  | NAS-72 | 102 |
|  |  | NAS-73 | 103 |

FIG.17

| NAS NAME | AVERAGE | DISPERSED |
|---|---|---|
| NAS-B | (10+5)/2=7.5 | ((10−7.5)^2+(5−7.5)^2)/2=6.25 |
| NAS-D | (15+30)/2=22.5 | ((15−22.5)^2+(30−22.5)^2)/2=56.25 |
| NAS-G | (104+102+103)/3=103 | ((104−103)^2+(102−103)^2+(103−103)^2)/3=0.67 |

| NAS NAME | MULTIPLICITY | VIRTUAL NAS NAME | DEGREE OF CONTRIBUTION |
|---|---|---|---|
| NAS-A | 1 | NAS-11 | 8 |
| NAS-B | 2 | NAS-21 | 10 |
|  |  | NAS-22 | 5 |
| NAS-C | 1 | NAS-31 | 7 |
| NAS-D | 2 | NAS-41 | 15 |
|  |  | NAS-42 | 30 |
| NAS-E | 1 | NAS-51 | 3 |
| NAS-F | 0 | − | − |
| NAS-G | 3 | NAS-71 | 104 |
|  |  | NAS-72 | 102 |
|  |  | NAS-73 | 103 |

AVERAGE = (8+10+···+103)/9 = 42.67

SELECT NAS-G HAVING LARGE AVERAGE VALUE AND SMALL DISPERSED VALUE

<BEFORE MIGRATION>

<AFTER MIGRATION>

<AFTER MERGE>

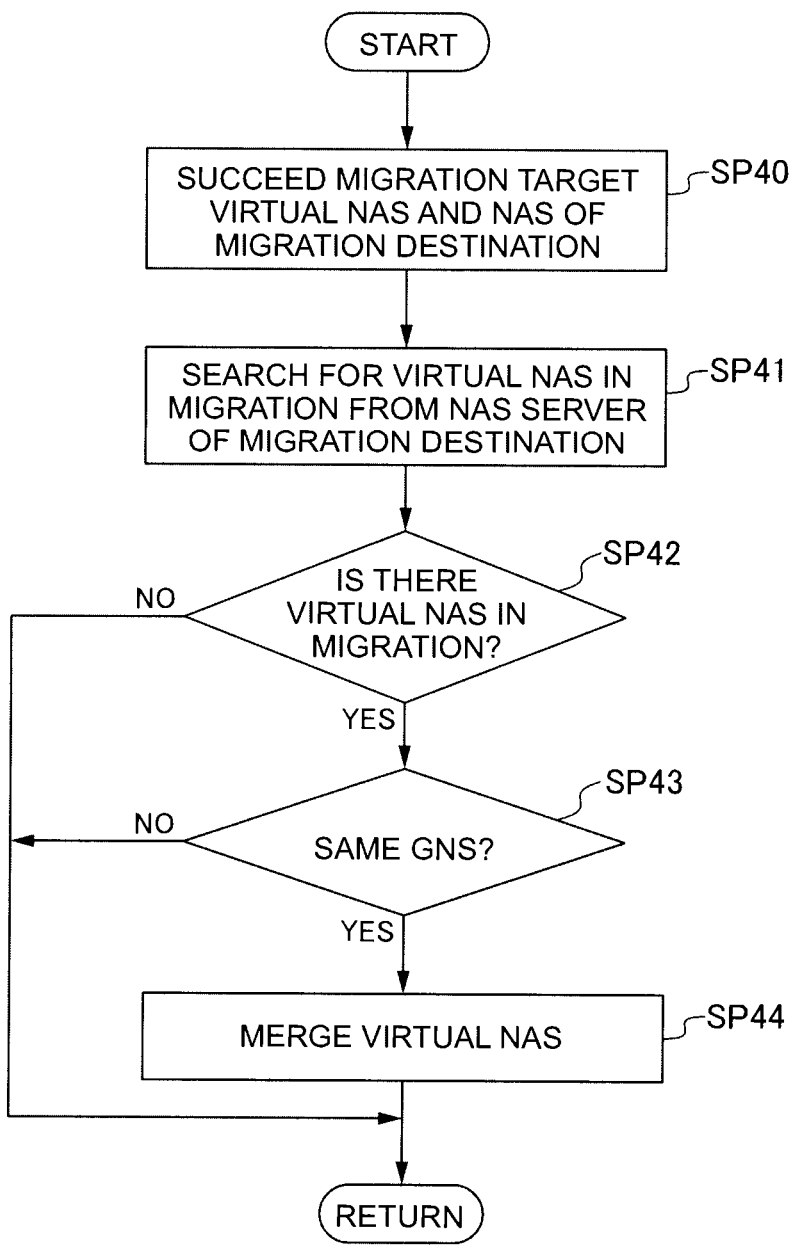

COMPUTER SYSTEM AND MANAGEMENT METHOD

CROSS REFERENCES

This application relates to and claims priority from Japanese Patent Application No. 2009-119219, filed on May 15, 2009, the entire disclosure of which is incorporated herein by reference.

BACKGROUND

The present invention relates to a computer system and a management method, and for instance can be suitably applied to a computer system comprising a plurality of NAS servers to which virtualization technology is applied.

Conventionally, as technology of applying virtualization technology to a NAS (Network Attached System), proposed is technology of running a virtual node (hereinafter referred to as the "virtual NAS") that provides a file sharing service to a client on a physical node (NAS server), and thereby providing a file server function (refer to Japanese Patent Laid-Open Publication No. 2003-223346; Patent Document 1).

Moreover, as another technology that applies virtualization technology to NAS, proposed is technology of unifying file system that are distributed to a plurality of NASes for a user (that is, to make it appear that it is a single NAS) by managing a plurality of NASes on a single namespace (GNS: Global Name Space) (refer to Japanese Patent Laid-Open Publication No. 2008-234568; Patent Document 2).

SUMMARY

Meanwhile, it is also possible to consider concurrently using the virtual NAS technology disclosed in Patent Document 1 and the technology of managing a plurality of NASes in a single namespace disclosed in Patent Document 2 so as to manage a plurality of virtual NASes in one GNS.

However, if this kind of technology is used in a data center or the like that is being used by a plurality of companies, there may be cases where a plurality of virtual NASes respectively existing in a different GNS (for example, virtual NAS existing in Company A's GNS, virtual NAS existing in Company B's GNS, virtual NAS existing in Company C's GNS, . . . ) will run on the same physical node.

In the foregoing case, if important file systems of the respective companies allocated to the corresponding GNS are disposed in a plurality of virtual NASes running on the physical node (that is, Company A's important file system is disposed in a virtual NAS existing in Company A's GNS, Company B's important file system is disposed in a virtual NAS existing in Company B's GNS, . . . ), and a failure occurs in that physical node, the influence from that failure will extent to a plurality of companies.

The present invention was devised in view of the foregoing points. Thus, an object of the present invention is to propose a computer system and a management method capable of localizing influence from a failure of a physical node and preventing influence from the physical node failure from spreading.

In order to achieve the foregoing object, the present invention provides a computer system comprising one or more servers that respectively provide a different single namespace to a client, a plurality of physical nodes that are capable of executing a plurality of virtual nodes that respectively belong to one of the single namespaces and provide a file sharing service to the client, and a management apparatus for managing the virtual nodes. In addition, the management apparatus includes a degree of contribution calculation processing unit for calculating a degree of contribution to a user for each of the virtual nodes, and a migration control unit that executes control for selecting the virtual node to be migrated and the physical node of a migration destination so as to average, among the physical nodes, a total value of the degree of contribution of each of the virtual nodes running on the physical nodes based on the degree of contribution to the user for each of the virtual nodes, and migrating the virtual node selected as the migration target to the physical node selected as the migration destination.

The present invention additionally provides a management method of managing virtual nodes that are running on a plurality of physical nodes capable of executing a plurality of virtual nodes that provide a file sharing service to a client, wherein each of the virtual nodes belongs to one of the single namespaces among one or more single namespaces. This management method comprises a first step of calculating a degree of contribution to a user for each of the virtual nodes, and a second step of selecting the virtual node to be migrated and the physical node of a migration destination so as to average, among the physical nodes, a total value of the degree of contribution of each of the virtual nodes running on the physical nodes based on the degree of contribution to the user for each of the virtual nodes, and migrating the virtual node selected as the migration target to the physical node selected as the migration destination.

According to the present invention, since virtual nodes with a high degree of contribution can be distributed to a plurality of physical nodes, it is possible to prevent virtual nodes respectively belonging to a different single namespace and respectively having a high degree of contribution from being concentrated on one physical node.

According to the present invention, since it is possible to prevent virtual nodes respectively belonging to a different single namespace and respectively having a high degree of contribution from being concentrated on one physical node, it is possible to localize influence from a failure of a physical node and prevent impact on the physical node failure from spreading.

DESCRIPTION OF DRAWINGS

FIG. 4 is a conceptual diagram showing a configuration example of a directory entry;

FIG. 11 is a conceptual diagram showing a configuration of a GNS-based NAS list table;

FIG. 12 is a conceptual diagram showing a configuration of a NAS-based NAS list table;

FIG. 13 is a conceptual diagram showing a configuration of a GNS multiplicity management table;

FIG. 16 is a conceptual diagram explaining a selection method of a migration target virtual NAS;

FIG. 17 is a conceptual diagram explaining a selection method of a migration target virtual NAS;

FIG. 23 is a flowchart showing a processing routine of merge processing; and

DETAILED DESCRIPTION

An embodiment of the present invention is now explained in detail with reference to the attached drawings.

(1) Configuration of Computer System in Present Embodiment

Figure 1:
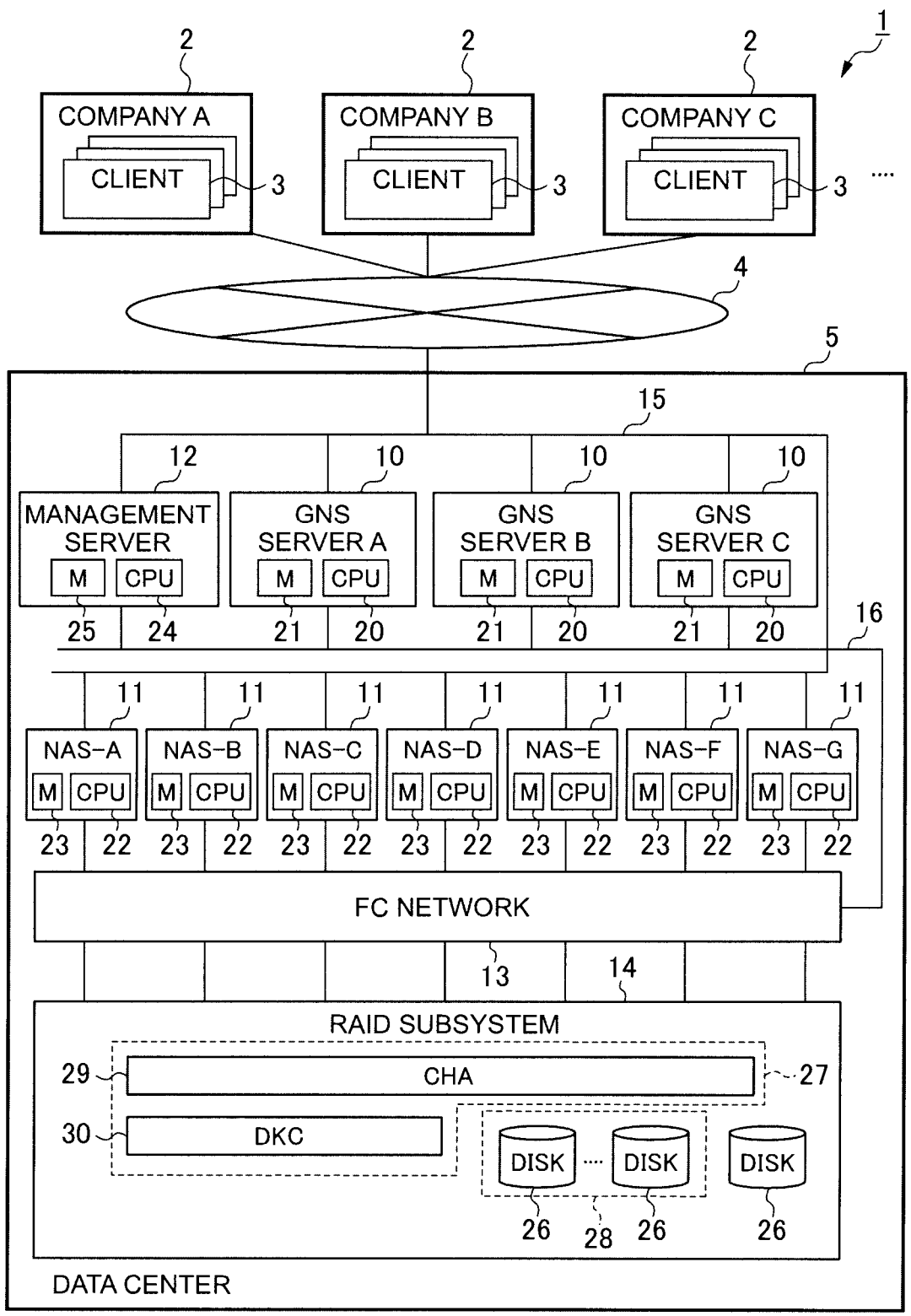
FIG. 1 is a block diagram showing a hardware configuration of a computer system according to an embodiment of the present invention.

FIG. 1 shows an overall computer system 1 according to an embodiment of the present invention. In the computer system 1, clients in a plurality of companies (Company A, Company B, Company C, ... ) 2 are respectively connected to a data center 5 via a network 4.

The client 3 is a computer device comprising information processing devices such as a CPU (Central Processing Unit), a memory, an NIC (Network Interface Card) and a hard disk device, and, for instance, is configured from a personal computer, a workstation, a mainframe or the like.

The data center 5 is equipped with a plurality of GNS servers 10, a plurality of NAS servers 11, a management server 12, an FC (Fibre Chanel) network 13, and a RAID (Redundant Arrays of Inexpensive Disks) subsystem 14. In the data center 5, the respective GNS servers 10, the respective NAS servers 11 and the management server 12 are connected via a first network 15, and the respective GNS servers 10, the management server 12 and the FC network 13 are connected via a second network 16.

The GNS server 10 is a server for unifying a plurality of NAS servers 11 and making them appear to be a single namespace (GNS) to the clients 3, and is configured by comprising information processing resources such as a CPU 20 and a memory 21. The GNS server 10 is connected to the first network 15 via an NIC (not shown), and is able to communicate with the management server 12 and the corresponding client 3 via the first network 15. Moreover, the GNS server 10 is connected to the second network 16 via an HBA (Host Bus Adapter) (not shown), and is able to read control programs such as a GNS management program 65 (FIG. 2) described later from the RAID subsystem 14 via the second network 16 at the time of startup.

The NAS server 11 is a server for providing a file sharing service to the clients 3, and is configured by comprising information processing resources such as a CPU 22 and a memory 23. As with the GNS server 10, the NAS server 11 is also connected to the second network 15 via an NIC (not shown), and is able to communicate with the management server 12 and the GNS server 10 via the second network 15. The NAS server 11 is also connected to the FC network 13 via an HBA (not shown).

The management server 12 is a server for a system administrator to manage the GNS servers 10, the NAS servers 11, the FC network 13 and the RAID subsystem 14 in the data center 5, and is configured from a personal computer, a workstation or the like. The management server 12 is configured by comprising information processing resources such as a CPU 24 and a memory 25, input devices such as a keyboard and a mouse, and output devices such as a display and a speaker. The management server 12 collects necessary information from the GNS servers 10, the NAS servers 11, the FC network 13, the RAID subsystem 14 and the like, and displays the collected information as needed and controls the GNS servers 10, the NAS servers 11, the FC network 13 and the RAID subsystem 14 by sending commands thereto.

The FC network 13 is configured from one or more FC switches. The exchange of data and commands between the GNS servers 10, the NAS server 11 or the management server 12 and the RAID subsystem 14 is conducted via the FC network 13.

The RAID subsystem 14 is a storage apparatus that is configured from one or more disk devices 26, and a control unit 27 for controlling the input and output of data to and from the disk devices 26. Incidentally, although FIG. 1 illustrates a case of providing only one RAID subsystem 14 in the computer system 1, a plurality of RAID subsystems 14 may also be provided.

The disk devices 26 are configured from expensive disks such as SCSI (Small Computer System Interface) disks or inexpensive disks such as SATA (Serial AT Attachment) disks or optical disks. One RAID group 28 is configured from one or more disk devices 26, and one or more logical volumes are set on a physical storage area provided by the respective disk devices 26 configuring the one RAID group 28. Data from a client is stored in units of a block (hereinafter referred to as the "logical block") of a prescribed size in the logical volume.

A unique volume number is assigned to each logical volume. In the case of this embodiment, the input and output of data are performed by using the combination of the volume number and a block number (LBA: Logical Block Address) of a logical volume to be assigned to each logical block as the address, and designating such address.

The control unit 27 is configured by comprising one or more channel adapters (CHA) 29, and one or more disk controllers (DKC) 30. The control unit 27 receives, in the channel adapter 29, an I/O (Input/Output) request that is sent from the NAS server 11 via the FC network 13, and reads and writes data from and into the corresponding disk device 26 according to the I/O request under the control of the disk controller 30.

Figure 2:
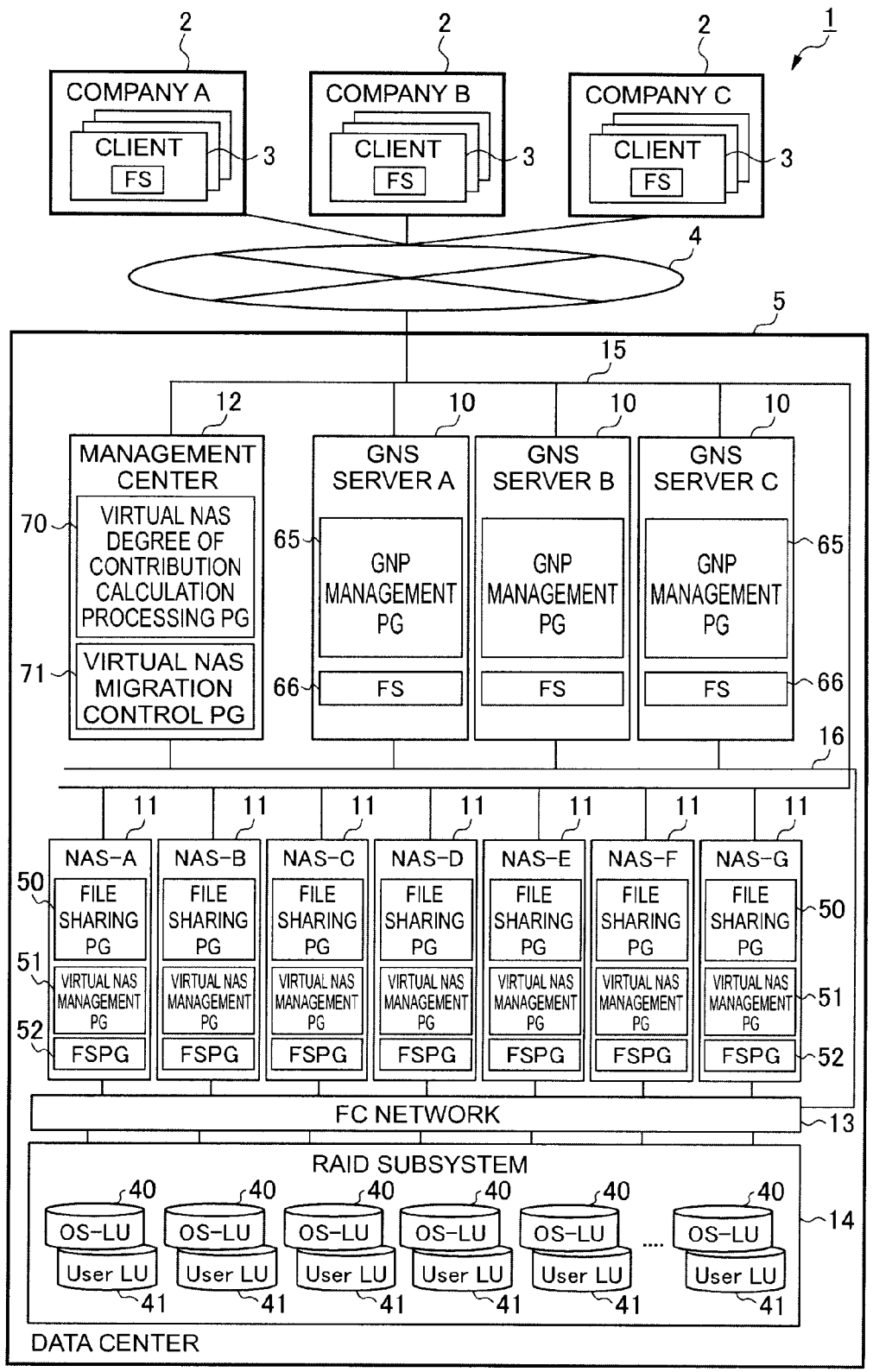
FIG. 2 is a block diagram showing a software configuration of a computer system according to an embodiment of the present invention.

FIG. 2 shows the software configuration of the computer system 1. In the computer system 1, a plurality of logical volumes described above are created in the RAID group 28 (FIG. 1) of the RAID subsystem 14. In the NAS environment, two types of logical volumes are created as the foregoing logical volumes; namely, an OS volume (OS-LU) 40 and a user volume (User-LU) 41.

The OS volume 40 is a logical volume storing programs to be used by the OS (Operation System) of the GNS server 10 and the NAS server 11. The user volume 41 is a logical volume storing data based on the I/O request from the client 3. The storage area provided by the user volume 41 is used by the file system.

The NAS server 11 is loaded with a file sharing program 50, a virtual NAS management program 51, and a file system program 52.

The file system program 52 is a program for managing file systems having a logical structure and created to realize the management unit of "files" in the physical volume.

Figure 3:
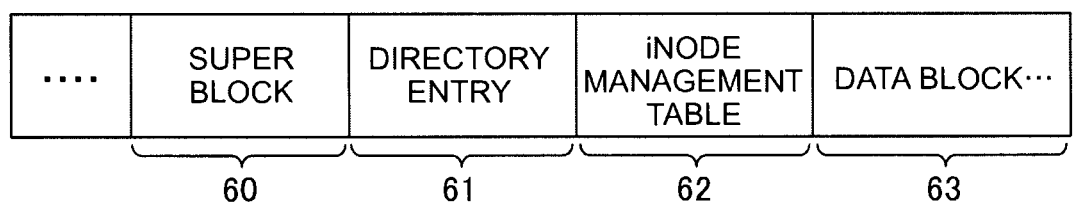
FIG. 3 is a conceptual diagram explaining a file system.

Here, to explain the file system, as shown in FIG. 3, a file system comprises a super block 60, a directory entry 61, an inode management table 62, and a data block 63. Among the above, the super block 60 is a logical block for collectively retaining information of the file system such as the size and unused capacity of the file system.

Moreover, in the file system, one inode is managed by being associated with one file, and this correspondence is managed in the directory entry 61. Specifically, as shown in FIG. 4, the directory entry is a table including a directory path name 61A and an inode index (hereinafter referred to as the "node number") 61B as a pair.

Figure 5:
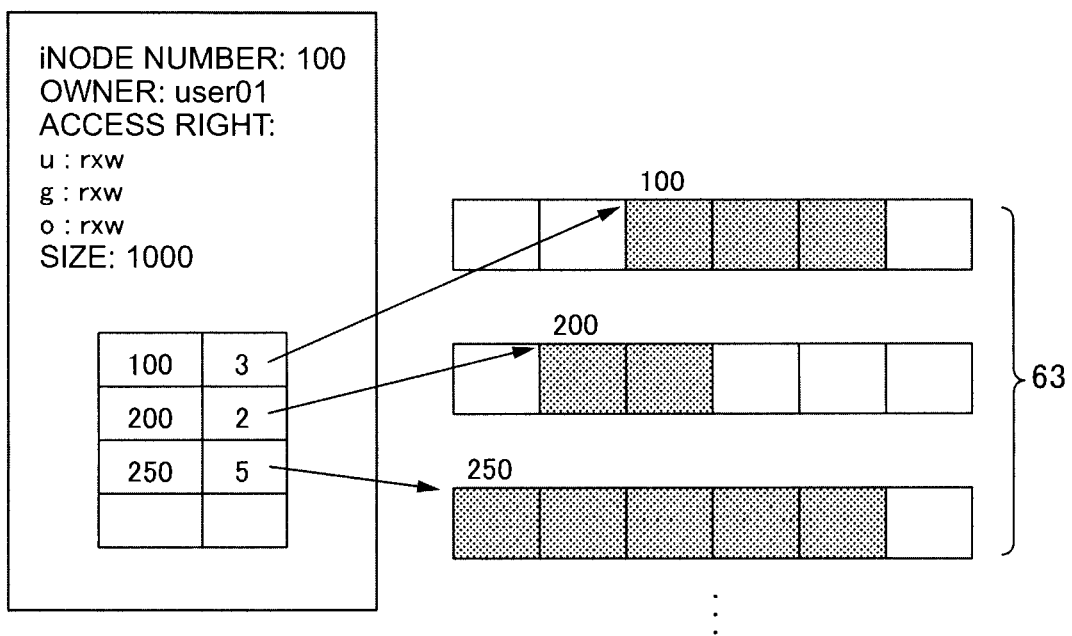
FIG. 5 is a conceptual diagram showing a reference example of a data block based on an inode.
Figure 6:
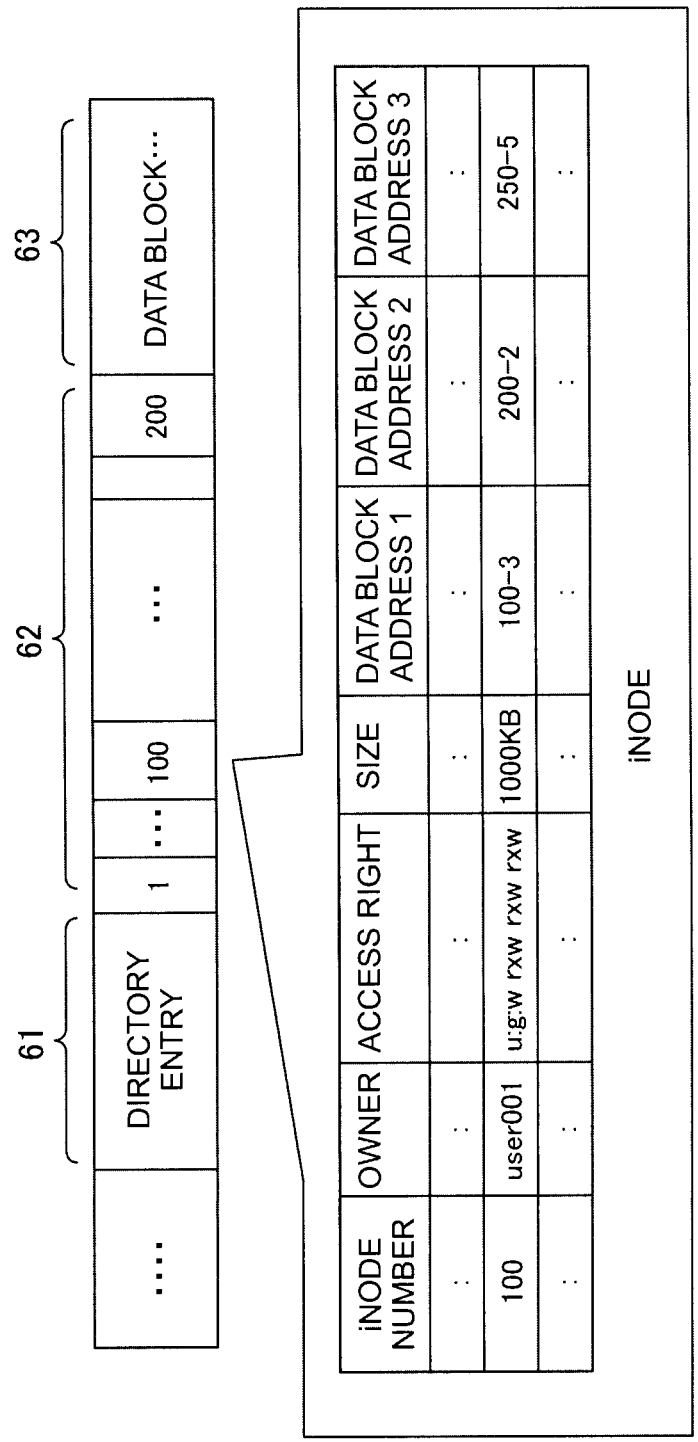
FIG. 6 is a conceptual diagram showing a relationship of an inode management table and an inode.

Incidentally, an inode is management information of the relevant file including information such as the ownership, access right, file size, and data storage location of the corresponding file. The referential relationship of the inode and the data block 63 is shown in FIG. 5. The numbers "100," "200" and "250" in the table within the frame border on the left side of FIG. 5 show the block addresses, and the numbers "3," "2" and "5" show the consecutive number of blocks of the data block 63 storing data from that block address. As shown in FIG. 6, the inode is stored in and managed by the inode management table 62.

The data block 63 is a logical block storing the actual file data, management data and the like.

The file sharing program 50 is a program that uses a communication protocol such as a CIFS (Common Internet File System) or an NFS (Network File System) to provide a file sharing service to the clients 3.

Figure 7:
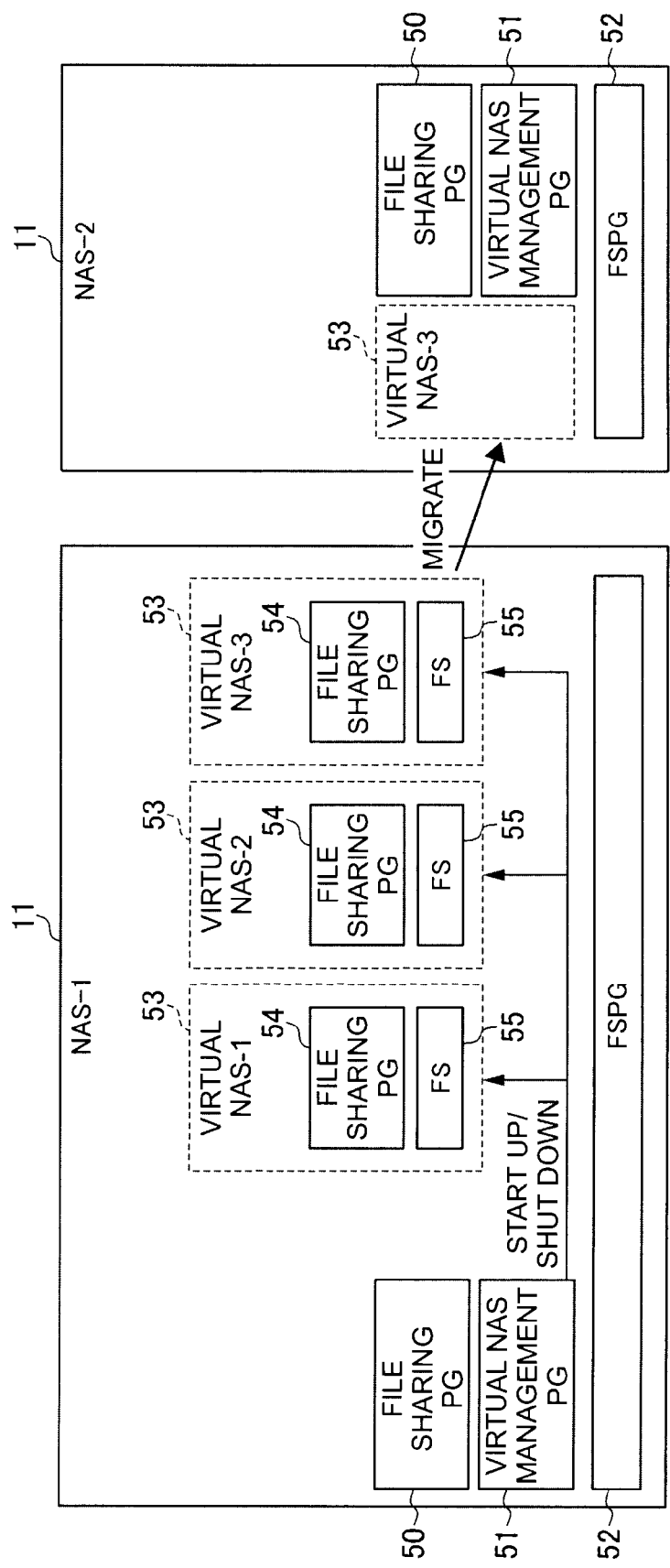
FIG. 7 is a block diagram explaining a virtual NAS management program.

The virtual NAS management program 51 is a management program for executing a plurality of virtual NASes (hereinafter referred to as the "virtual NAS") on a physical node (NAS server) and, as shown in FIG. 7, performs the startup, shutdown and migration of the virtual NAS 53. Migration of the virtual NAS 53 is performed by migrating data that is stored in the user volume 41 (FIG. 2) to the migration destination NAS server 11 after shutting down the virtual NAS 53 in the migration source NAS server 11, switching the connection of the user volume 41 storing the OS volume 40 (FIG. 2) and the user data to the migration destination NAS server 11, and thereafter re-starting the OS volume 40.

Incidentally, the NAS server 11 comprises a kernel (not shown) in addition to the file sharing program 50, the virtual NAS management program 51, and the file system program 52. The kernel implements the overall control including the schedule control of a plurality of programs (processes) running on the NAS server 11 and the handling of interruption from the hardware.

Figure 8:
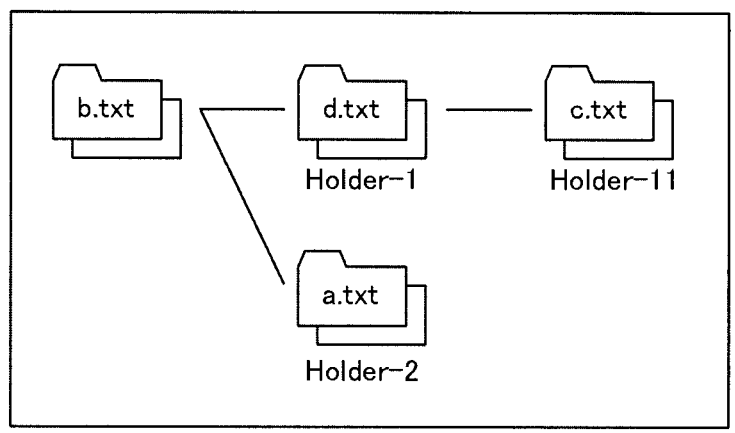
FIG. 8 is a conceptual diagram showing an example of a directory image to be provided by a GNS server to a client.

The GNS server 10 is equipped with a GNS management program 65. The GNS management program 65 is a program for providing to the clients 3 a view of file data that is distributed and stored in a plurality of NAS servers 11 that is unified with a single directory image. For example, a directory image as shown in FIG. 8 is provided to the clients 3.

Figure 9:
FIG. 9 is a conceptual diagram showing a configuration of a file management table.

Here, the GNS management program 65 creates a file management table 64 as shown in FIG. 9. The file management table 64 is configured from a directory path name column 64A, a host name column 64B, a file system name column 64C, and an inode number column 64D. Among the above, the directory path name column 64A stores the directory path name to the respective files belonging to the GNS provided by the GNS management program 65 to the clients 3, and the host name column 64B stores the NAS name of the NAS server 11 that is managing those files. The file system name column 64C stores the file system name of the file system providing those files, and the inode column 64D stores the inode number of the inode of those files.

Figure 10:
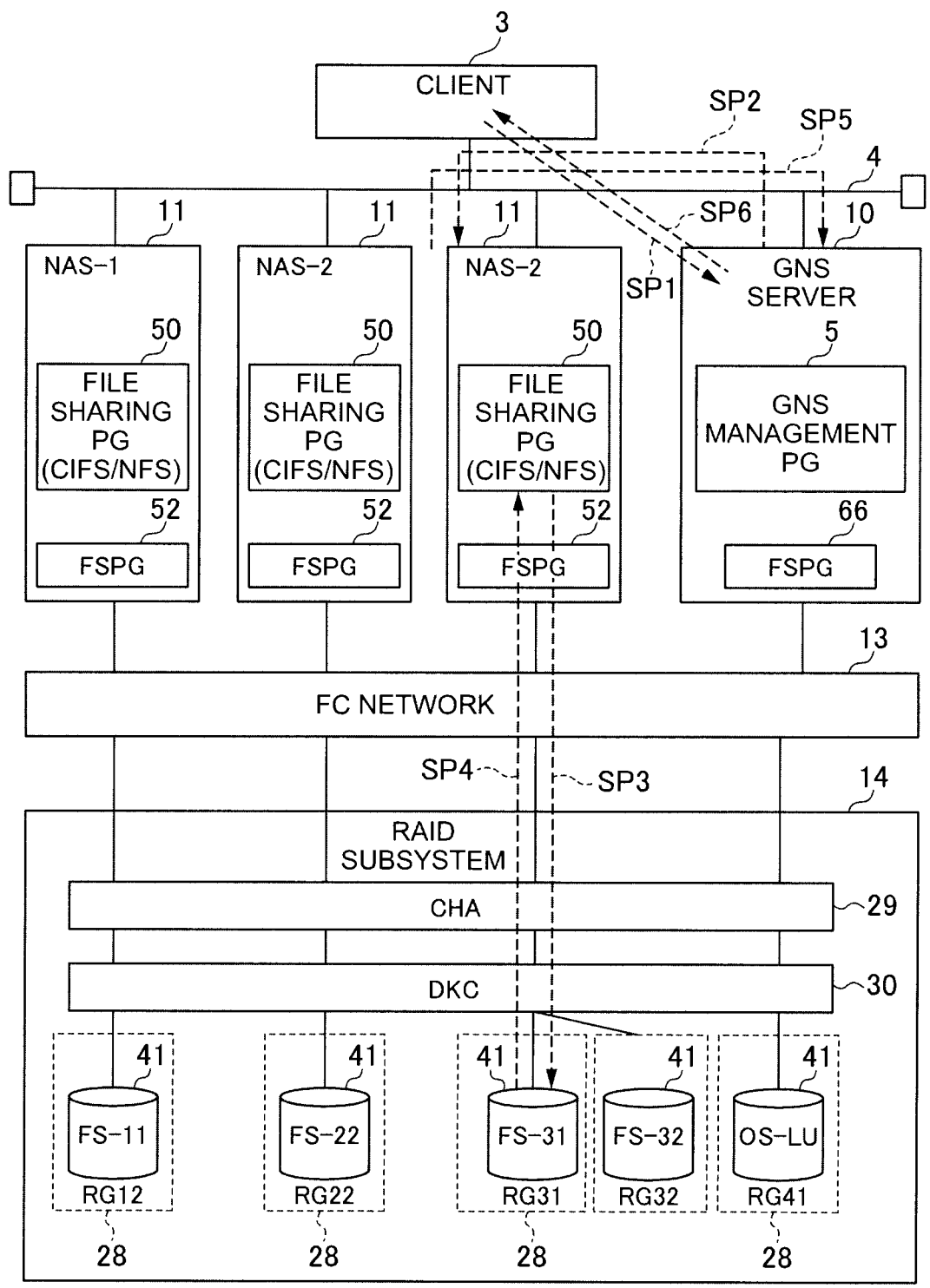
FIG. 10 is a block diagram explaining a GNS processing flow.

If, for instance, in the example shown in FIG. 9, the GNS management program 65 receives a read request from the client 3 to a file in which the directory path name is "/Holder-2/a.txt" (FIG. 10, SP1), as shown in FIG. 10, it converts this read request into a read request of a file in which the inode number is "1000(a.txt)" and located in the file system "FS31" of the "NAS-3" by using the foregoing file management table 64, and sends this read request to the "NAS-3" (SP2). Then the "NAS-3" reads "a.txt" from the user volume 41 in accordance with the read request (SP3, SP4). The "a.txt" is thereafter transferred from the "NAS-3" to the client 3 via the GNS server 10 (SP5, SP6).

Incidentally, the GNS server 10 is loaded with a file system program 66 and a kernel (not shown) in addition to the GNS management program 65. However, since the file system program 66 and the kernel have the same function as those of the NAS server 11, the explanation thereof is omitted.

Meanwhile, as shown in FIG. 2, the management server 12 is loaded with a virtual NAS degree of contribution calculation processing program 70 and a virtual NAS migration control program 71. The virtual NAS degree of contribution calculation processing program 70 is a program for calculating the virtual NAS degree of contribution described later, and the virtual NAS migration control program 71 is a program for migrating the migration target virtual NAS that was selected and decided based on the virtual NAS degree of contribution to another NAS server 11. Details regarding the virtual NAS degree of contribution calculation processing program 70 and the virtual NAS migration control program 71 will be described later. Incidentally, although not shown in FIG. 2, the management server 12 is also loaded with a kernel and a file system program.

The client 3 is also loaded with various types of application software, and data to be used by such application software is read from and written into the RAID subsystem 14 of the data center. As a means for realizing the above, the client 3 is also loaded with a file system program and a kernel.

(2) Virtual NAS Management Function of Present Embodiment (2-1) Outline and Configuration of Various Types of Management Tables The virtual NAS management function loaded in the management server 12 is now explained. The management server 12 of this embodiment is equipped with a virtual NAS management function for calculating the level that a virtual NAS is being useful to a user as the degree of contribution for each virtual NAS that is defined in the computer system 1. If a plurality of virtual NASes with a high degree of contribution exist in one NAS server 11, virtual NAS management function migrates one of the virtual NASes to another NAS server 11 so as to average, among the NAS servers 11, the total value of the degree of contribution of the respective virtual NASes running on the NAS server 11.

As means for executing the virtual NAS management processing (hereinafter referred to as the "virtual NAS management processing") based on this kind of virtual NAS management function, the memory 25 (FIG. 1) of the management server 12 stores the GNS-based NAS list table 80, the NAS-based virtual NAS list table 81, and the GNS multiplicity management table 82 shown in FIG. 11 to FIG. 13.

The GNS-based NAS list table 80 is a table for managing the NAS server 11 configuring the GNS and is configured, as shown in FIG. 11, from a GNS name column 80A and a NAS name column 80B. The NAS name column 80B stores the NAS name of the respective virtual NASes that are defined in the computer system 1, and the GNS name column 80A stores the identifier (hereinafter referred to as the "GNS name") of the GNS to which that virtual NAS belong.

The NAS-based virtual NAS list table 81 is a table for managing the virtual NASes running of the NAS server 11 and, as shown in FIG. 12, is configured from a NAS name column 81A and a virtual NAS name column 81B. The virtual NAS name column 81B stores the NAS name of the respective virtual NASes created in the computer system 1, and the NAS name column 81A stores the NAS name of the NAS server 11 in which those virtual NASes were created.

The GNS multiplicity management table 82 is a table for managing the multiplicity of the GNS in the NAS server 11 and, as shown in FIG. 13, is configured from a NAS name column 82A, a multiplicity column 82B, and a GNS name column 82C. The NAS name column 82A stores the NAS name of the corresponding NAS server 11, and the multiplicity column 82B stores the number (hereinafter referred to as the "multiplicity") of GNSes to which that NAS server 11 is associated. The GNS name column 82C stores the GNS name of all GNSes to which the corresponding NAS server 11 is associated.

(2-2) Flow of Virtual NAS Management Processing

Figure 14:
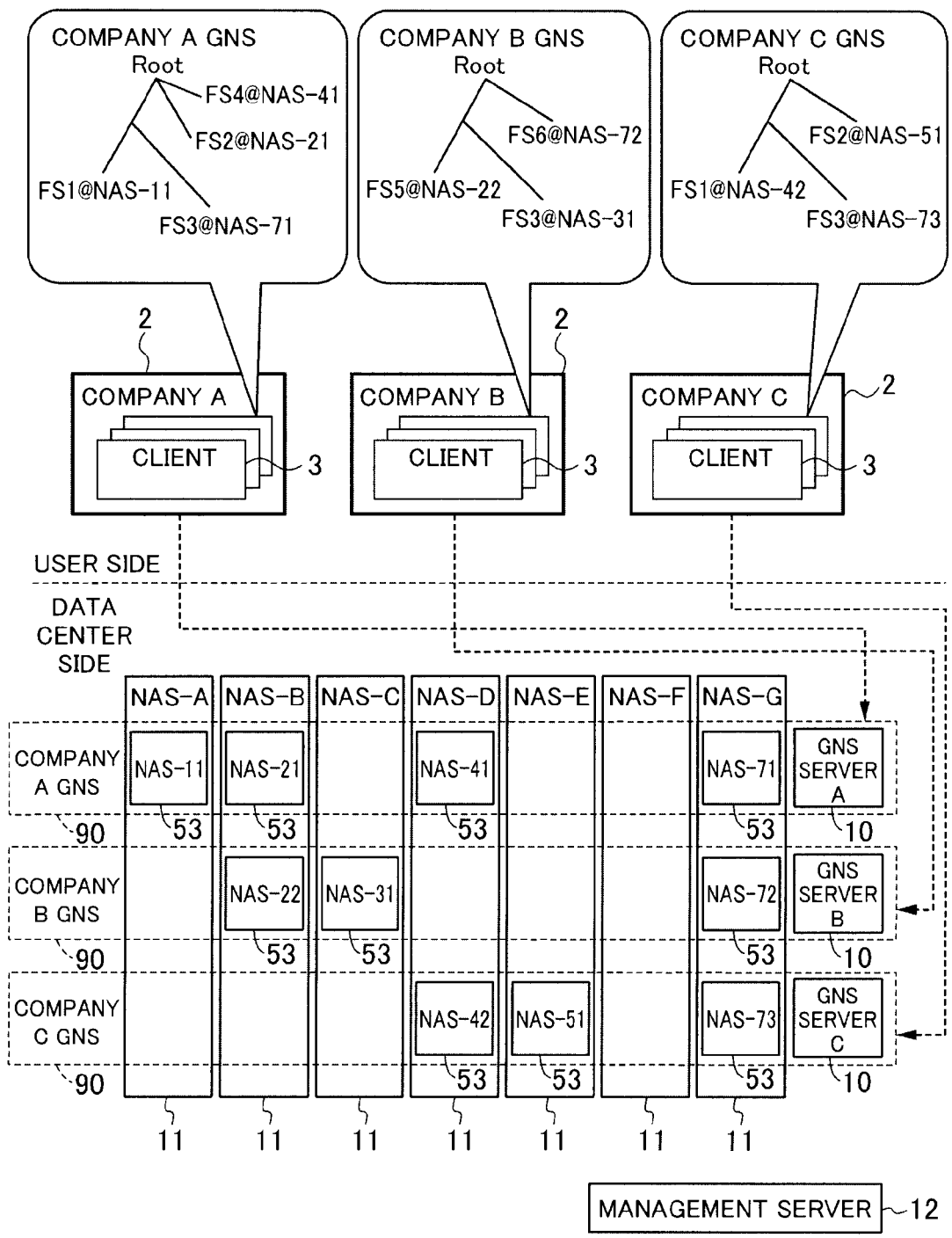
FIG. 14 is a conceptual diagram showing an example of configuring GNS with a virtual NAS.

FIG. 14 shows an example of configuring a plurality of GNSes 90 across a plurality of NAS servers 11. In this example, "NAS-11" is running on "NAS-A," "NAS-21" and "NAS-22" are running on "NAS-B," "NAS-31" is running on "NAS-C," "NAS-41" and "NAS-42" are running on "NAS-D," "NAS-51" is running on "NAS-E," and "NAS-71," "NAS-72" and "NAS-73" are running on "NAS-G," respectively. Incidentally, "NAS-A" to "NAS-G" are respectively NAS servers, and "NAS-11" to "NAS-73" are respectively virtual NASes.

The virtual NASes 53 of "NAS-11," "NAS-21," "NAS-41" and "NAS-71" are provided to the respective clients 3 of "Company A" in a status of existing in the same GNS by the GNS server 10 of "GNS server A," the virtual NASes 53 of "NAS-22," "NAS-31" and "NAS-72" are provided to the respective clients 3 of "Company B" in a status of existing in the same GNS by the GNS server 10 of "GNS server B," and the virtual NASes 53 of "NAS-42," "NAS-51" and "NAS-73" are provided to the respective clients 3 of "Company C" in a status of existing in the same GNS by the GNS server 10 of "GNS server C."

The virtual NAS management processing flow according to this embodiment in the foregoing case is now explained.

Figure 15:
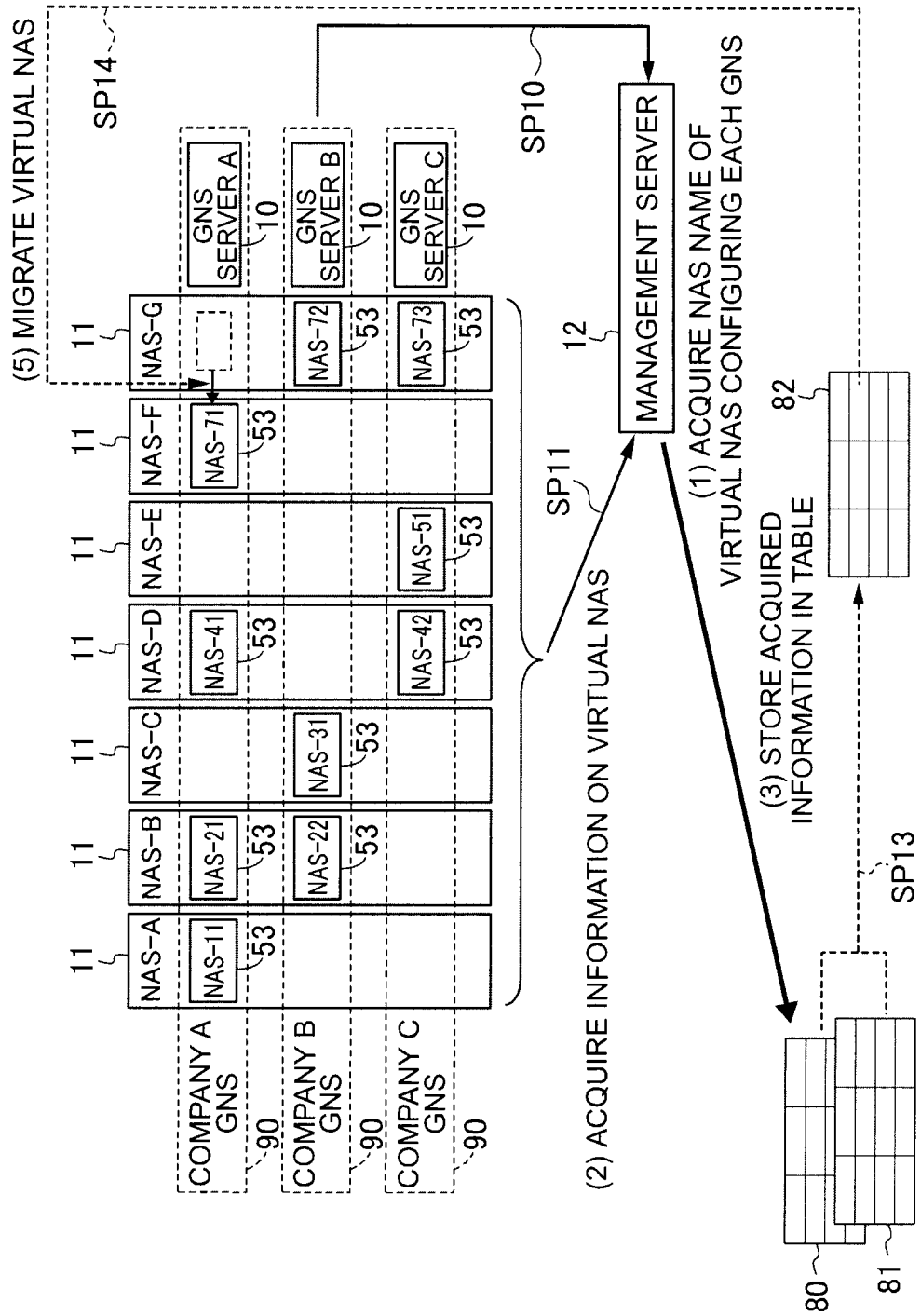
FIG. 15 is a conceptual diagram explaining a virtual NAS management processing flow according to an embodiment of the present invention.

The management server 12, as shown in FIG. 15, foremost commands each GNS server 10 to notify the NAS name of all virtual NASes 53 belonging to the GNS 90 that is being managed by that GNS server 10. The GNS servers 10 that received the foregoing command respectively refer to the file management table 64 (FIG. 9), and notifies the NAS name of all virtual NASes 53 belonging to the GNS 90 that it is self-managing to the management server 12 (SP10).

When the management server 12 receives the foregoing notice from the GNS server 10, it stores the NAS name in the GNS-based NAS list table 80. The management server 12 also accesses the respective NAS servers 11 in order, acquires the NAS name of the virtual NASes 53 running on that NAS server 11 (SP11), and stores the acquired NAS name in the NAS-based virtual NAS list table 81.

The management server 12 refers to the GNS-based NAS list table 80 and the NAS-based virtual NAS list table 81 that were created as described above, seeks the multiplicity of the GNS 90 (hereinafter referred to as the "GNS multiplicity") in the respective NAS servers 11, and registers the GNS multiplicity and GNS name of each NAS server 11 in the GNS multiplicity management table 82 (SP13).

Subsequently, the management server 12 refers to the GNS multiplicity management table 82 that was created as described above and calculates the degree of contribution to the user of each virtual NAS 53 (hereinafter referred to the "virtual NAS degree of contribution" as appropriate) running on the NAS server 11 in which the GNS multiplicity is a predetermined threshold value or greater.

Incidentally, the threshold value shall be "2" in the following explanation. Thus, in the case of the example shown in FIG. 15, since the NAS servers 11 in which the GNS multiplicity is "2" or greater are "NAS-B," "NAS-D" and "NAS-G," the processing to be performed in this case will be to calculate the virtual NAS degree of contribution of the virtual NASes 53 ("NAS-21," "NAS-22," "NAS-41," "NAS-42," "NAS-71," "NAS-72" and "NAS-73") that are running on "NAS-B," "NAS-D" or "NAS-G."

Here, the virtual NAS degree of contribution is a quantitative scale representing how much that virtual NAS 53 is being useful to the user, and larger the value, the higher the degree of contribution of that virtual NAS 53 to the user. The virtual NAS degree of contribution is calculated using evaluation functions that are computed from several evaluation items.

As the foregoing evaluation functions, the following formulae may be considered:

[Formula 1]

$$\text{Virtual NAS degree of contribution} = \text{evaluation item } 1 \times \text{evaluation item } 2 \times \quad (1)$$

in which the scores of various types of evaluation items are simply multiplied; or

[Formula 2]

$$\text{Virtual NAS degree of contribution} = W1 \times \text{evaluation item } 1 + W2 \times \text{evaluation item } 2 + \quad (2)$$

in which the scores of various types of evaluation items are weighed and added. Incidentally, in Formula (2), W1, W2, . . . represent the weighted value, and a real number of 0 or greater is selected.

If foregoing Formula (1) is used as the evaluation function, the size of the evaluation item will be considerably reflected in the virtual NAS degree of contribution, and the migration target virtual NAS 53 can be selected easily since the difference in the virtual NAS degree of contribution will be emphasized. Moreover, if foregoing Formula (2) is used as the evaluation function, the evaluation characteristics can be controlled since the effectiveness of the respective evaluation items can be adjusted.

Incidentally, if there are a plurality of evaluation items, since the unit of each evaluation item will differ, it will not be possible to simply add or multiply the scores of the respective evaluation items. Accordingly, in the foregoing case, it is necessary to use values such as the ratio or multiplying factor (score/average value of evaluation items) must be used as the evaluation item.

The following are evaluation items that can be used for quantitatively evaluating how high the degree of contribution to the user is; that is, how useful the virtual NAS is to the user.

(a) Number of Links to the Files that are Being Managed by the Virtual NAS

Including the number of links from the files that are being managed in other virtual NASes, and greater the number of citations from files other than the self-file, higher the degree of contribution.

(b) Number of Users to Access the Virtual NAS

Number of users who access the virtual NAS at a given frequency or higher and in which a given period of time has elapsed since the user account has been registered. The greater the number of regular users, the higher the contribution of the virtual NAS to the user.

(c) Number of Shared Directors Provided by the Virtual NAS

The degree of contribution to the user in the file sharing service is evaluated based on the number of shared directories.

(d) Number of Files Replicated in the Client

If the virtual NAS is able to access the client, whether files have been replicated by the virtual NAS on the client is searched, and the degree of contribution of the virtual NAS is evaluated based on the number of replicated files.

Subsequently, the management server 12 seeks the statistical values (average value and dispersed value) in units of the NAS server 11 based on the calculated virtual NAS degree of contribution of each of the corresponding virtual NASes 53, and selects and decides the virtual NAS 53 to be migrated based on the foregoing statistical values.

For example, in the case shown in FIG. 15, let it be assumed that there are three NAS servers in which the GNS multiplicity is "2" or greater; namely, "NAS-B," "NAS-D" and "NAS-G" as described above, and the virtual NAS degrees of contribution of the virtual NASes ("NAS-21," "NAS-22," "NAS-41," "NAS-42," "NAS-71," "NAS-72" and "NAS-73") respectively running on the foregoing three virtual servers 53 are the values shown in FIG. 16. In this case, the average and dispersion of the virtual NAS degrees of contribution in the respective NAS servers 11 will be as shown in FIG. 17.

Moreover, if all virtual NASes in the data center are considered to be the population and the virtual NAS degrees of contribution of all virtual NASes 53 are the values shown in FIG. 17, the average value $A_{VE}$ of the virtual NAS degrees of contribution in the entire data center 5 can be calculated from the following formula:

[Formula 3]

$$A_{VE} = (8 + 10 + \ldots + 103)/9 \quad (3)$$
$$= 42.67$$

Then the management server 12 selects and decides the migration target virtual NAS 53 based on the average value and dispersed value of the virtual NAS degrees of contribution in the respective NAS servers 12 in which the GNS multiplicity is "2" or greater as sought above, and based on the average value $A_{VE}$ of the virtual NAS degrees of contribution in the entire data center 5.

For example, if the average value of the virtual NAS degrees of contribution in the NAS server 11 is higher than the overall average value, and the dispersed value in that NAS server 11 is smaller than the overall dispersed value, it can be considered that virtual NASes 53 with a high virtual NAS degree of contribution are concentrated in that NAS server 11. In the case of the example shown in FIG. 17, the NAS server 11 of "NAS-G" corresponds to this kind of NAS server 11.

Thus, the management server 12 decides the virtual NAS ("NAS-71") 53 with the highest degree of contribution within the NAS server 11 of "NAS-G" as the migration target virtual NAS 53.

The management server 12 subsequently selects and decides the migration destination NAS server 11 for the migration target virtual NAS 53 decided above. Specifically, the management server 12 decides the NAS server 11 that satisfies any one of the following conditions (a) to (c) as the migration destination.

(a) Virtual NAS in which the GNS multiplicity is "0"

Figure 18:
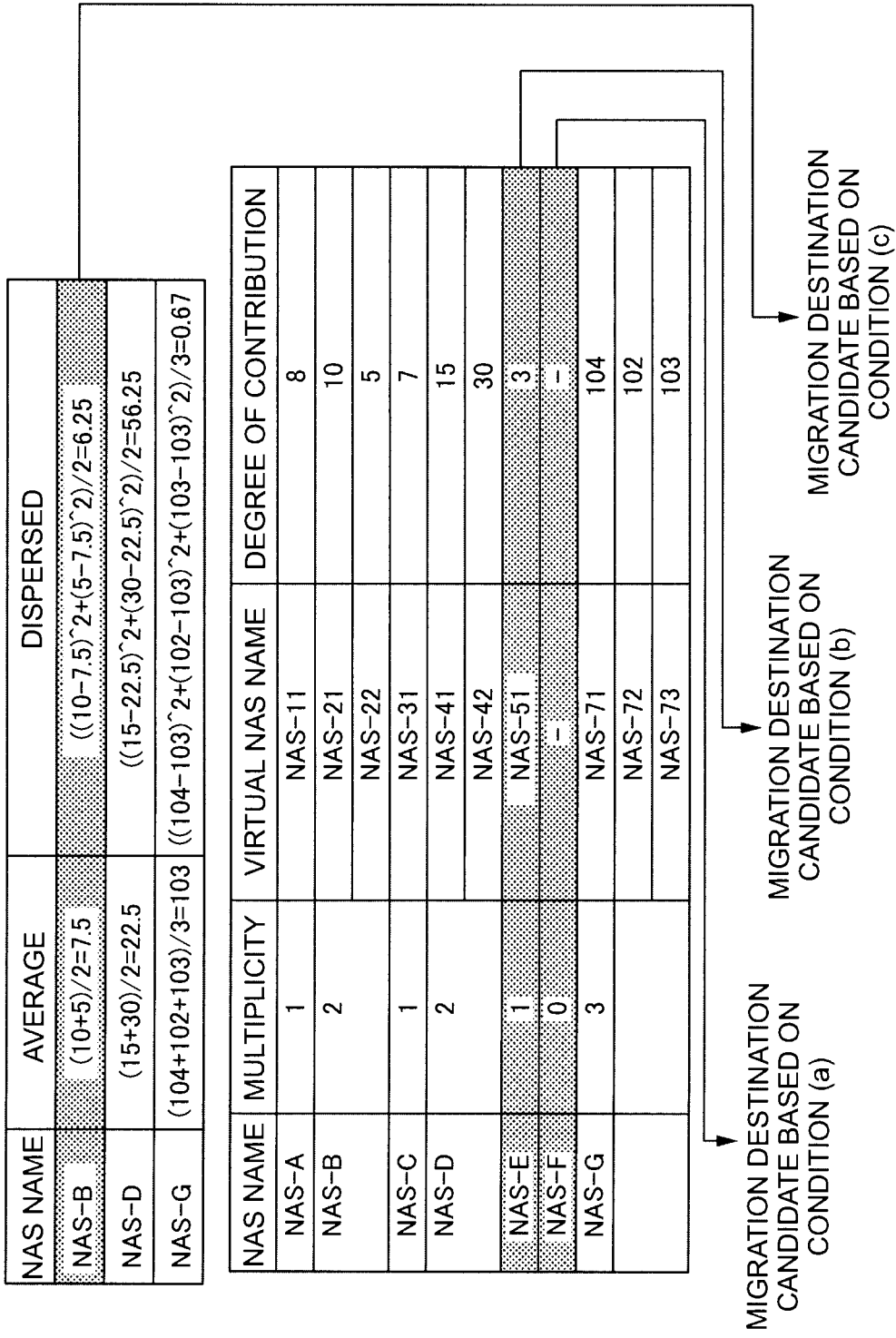
FIG. 18 is a conceptual diagram explaining a selection method of a migration destination candidate.

(b) If the GNS multiplicity is "1," the NAS with the lowest virtual NAS degree of contribution (c) If the GNS multiplicity is "2" or greater, the NAS server in which the statistical values (average values and dispersed value) of the virtual NAS degree of contribution are less than a constant value For instance, in the case of the example shown in FIG. 18, if foregoing condition (a) is observed, "NAS-F" in which the GNS multiplicity is "0" becomes the migration destination candidate, and if condition (b) is observed, "NAS-E" with the lowest virtual NAS degree of contribution among "NAS-A," "NAS-C" and "NAS-E" in which the GNS multiplicity is "1" becomes the migration destination candidate. If condition (c) is observed, and the constant value is "10," "NAS-B" becomes the migration destination candidate.

However, even if "observe condition (a)" is defined as the selection method of the migration destination candidate, there may be cases where such a NAS server 11 does not exist. Thus, a priority level is set to the foregoing conditions (a) to (c) as the selection method of the migration destination candidate, and, if a NAS server 11 that does not satisfy the condition with the highest priority level does not exist, then a NAS server 11 that satisfies the condition with the next highest priority level becomes the migration destination candidate, and if a NAS server 11 that does not satisfy such a condition does not exist, then a NAS server 11 that satisfies the condition with the next highest priority level becomes the migration destination candidate. In the case of this embodiment, conditions with the highest priority level are in the order of (a), (b) and (c).

Figure 19:
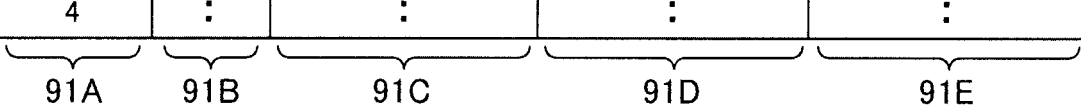
FIG. 19 is a block diagram showing a configuration of a configuration information management table.

A method of selecting and deciding the migration destination candidate of the virtual NAS 53 based on the configuration information of the NAS server 11 may also be considered. For example, as the configuration of the NAS server 11, there are two types; namely, a single node and a cluster node, and there is the status of a redundant path as the connection mode between the NAS server 11 and the RAID disk subsystem 14. Accordingly, if the management server 12 is retaining the configuration information management table 91 as shown in FIG. 19, for example, it will be possible to determine whether to migrate the virtual NAS 53 to a NAS server 11 with a high reliability or to a NAS server 11 with a low reliability according to the size of the virtual NAS degree of contribution of the migration target virtual NAS 53 upon deciding the migration destination candidate.

Incidentally, the configuration information management table 91 is a table for managing the configuration status concerning the reliability for each NAS server 11, and is configured from a ranking column 91A, a NAS name column 91B, a NAS configuration column 91C, a path configuration column 91D, and a switch configuration column 91E. The NAS name column 91B stores the NAS name of the corresponding NAS server 11, and the NAS configuration column 91C stores information representing whether the NAS server 11 is configured as a single node or a cluster node. The path configuration column 91D stores information representing whether the path configuration between the NAS server 11 and the RAID subsystem 14 is a multi path or a single path, and the switch configuration column 91E stores information representing whether the FC switching configuring the FC network 13 (FIG. 1) between the NAS server 11 and the RAID subsystem 14 is a cluster configuration or a single configuration. The ranking column 91A stores the ranking regarding the reliability among all NAS servers 11 existing in the computer system 1. This ranking will be higher for NAS servers 11 with a higher redundant configuration. Incidentally, the various types of information retained in the configuration information management table 91 are stored by the administrator in advance.

Subsequently, the management server 12 migrates the virtual NAS 53 that was decided as the migration target as described above to the NAS server 11 that was decided as the migration destination as described above (step SP14 of FIG. 15). Here, if a plurality of virtual NASes with a high virtual NAS degree of contribution exist, the management server 12 performs control for relocating those virtual NASes 53 to a separate NAS server 11 with a low GNS multiplicity, and lowering the total value of the virtual NAS degrees of contribution in the respective NAS servers 11.

(2-3) Specific Processing of Management Servicer for Virtual NAS Management Processing The specific processing contents of the management server 12 concerning the virtual NAS management processing according to this embodiment are now explained. Incidentally, although the processing entity of the various types of processing is explained as a "program" loaded in the management server 12, in fact, it goes without saying that the CPU 24 (FIG. 1) of the management server 12 or the CPU 22 (FIG. 1) of the corresponding NAS server 11 executes the processing based on that program.

(2-3-1) Virtual NAS Degree of Contribution Calculation Processing

Figure 20:
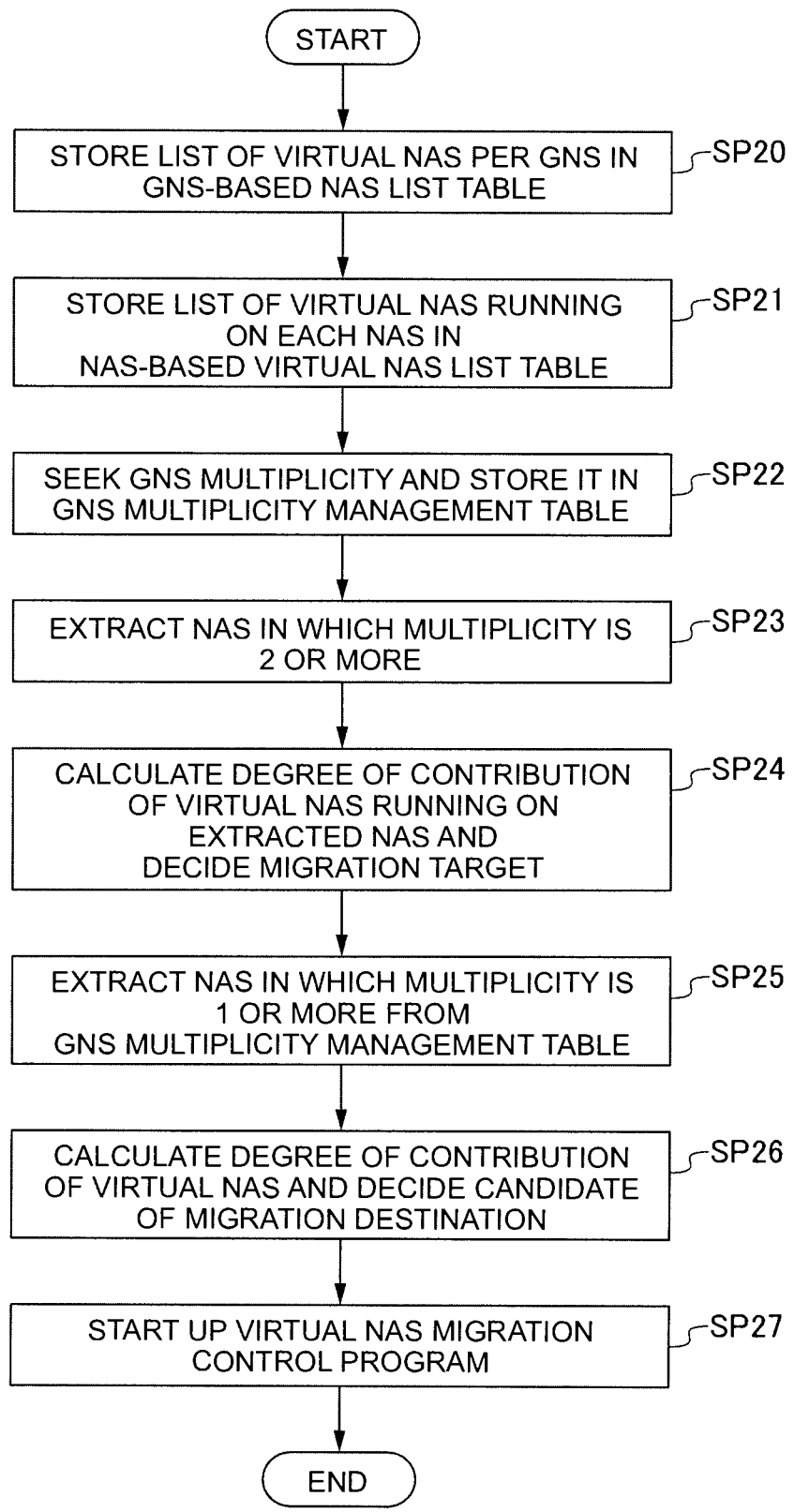
FIG. 20 is a flowchart showing a processing routine of virtual NAS degree of contribution calculation processing.

FIG. 20 shows the processing routine of the virtual NAS degree of contribution calculation processing to be executed by the virtual NAS degree of contribution calculation processing program 70 (FIG. 2) of the management server 12 regarding the calculation of the virtual NAS degree of contribution for each virtual NAS 53. The virtual NAS degree of contribution calculation processing program 70 periodically executes the virtual NAS degree of contribution calculation processing, and calculates the virtual NAS degree of contribution for each virtual NAS 53.

Specifically, when the virtual NAS degree of contribution calculation processing program 70 starts this virtual NAS degree of contribution calculation processing, it foremost accesses each GNS server 10 in the data center 5, acquires the NAS name of all virtual NASes 53 belonging to the GNS 90 (FIG. 15) provided by that GNS server 10, and registers each of the acquired NAS names in the GNS-based NAS list table 80 (FIG. 11) corresponding to the GNS 90 to which each virtual NAS 53 belongs (SP20).

Subsequently, the virtual NAS degree of contribution calculation processing program 70 accesses each NAS server 11 in the data center 5, acquires the NAS name of all virtual NASes 53 running on that NAS server 11 for each NAS server 11, and registers the NAS name of each of the acquired virtual NASes 53 in the NAS-based virtual NAS list table 81 (FIG. 12) corresponding to the NAS server 11 running on that virtual NAS 53 (SP21).

Subsequently, the virtual NAS degree of contribution calculation processing program 70 refers to the GNS-based NAS list table 80 and the NAS-based virtual NAS list table 81, and seeks the GNS multiplicity of the GNS 90 for each NAS server 11. Moreover, the virtual NAS degree of contribution calculation processing program 70 associates the sought GNS multiplicity of each NAS server 10 and the specific GNS name belonging to that NAS server 11 and stores such association in the GNS multiplicity management table 82 (FIG. 13) (SP22).

Subsequently the virtual NAS degree of contribution calculation processing program 70 refers to the GNS multiplicity management table 82 and extracts all NAS servers 11 in which the GNS multiplicity is "2" or greater (SP23). The virtual NAS degree of contribution calculation processing program 70 also calculates the virtual NAS degree of contribution of all virtual NASes 53 running of the NAS server regarding each of the extracted NAS servers 11, and selects and decides the migration target virtual NAS 53 based on the calculation result (SP24).

Subsequently, the virtual NAS degree of contribution calculation processing program 70 extracts the NAS server 11 from the GNS multiplicity management table 82 in which the multiplicity is "1" or less (SP25). Moreover, the virtual NAS degree of contribution calculation processing program 70 calculates the virtual NAS degree of contribution of the virtual NAS running on the extracted NAS server 11, and selects and decides the migration destination candidate of the migration target virtual NAS 53 decided at step SP24 based on the calculation result (SP26).

Subsequently, the virtual NAS degree of contribution calculation processing program 70 starts up the virtual NAS migration control program 71 (FIG. 2), delivers the NAS name of the migration target virtual NAS 53 decided at step SP24 and the server name of the migration destination NAS server 11 decided at step SP26 to the virtual NAS migration control program 71 (SP27), and thereafter ends this virtual NAS degree of contribution calculation processing.

(2-3-2) Virtual NAS Migration Control Processing

Figure 21:
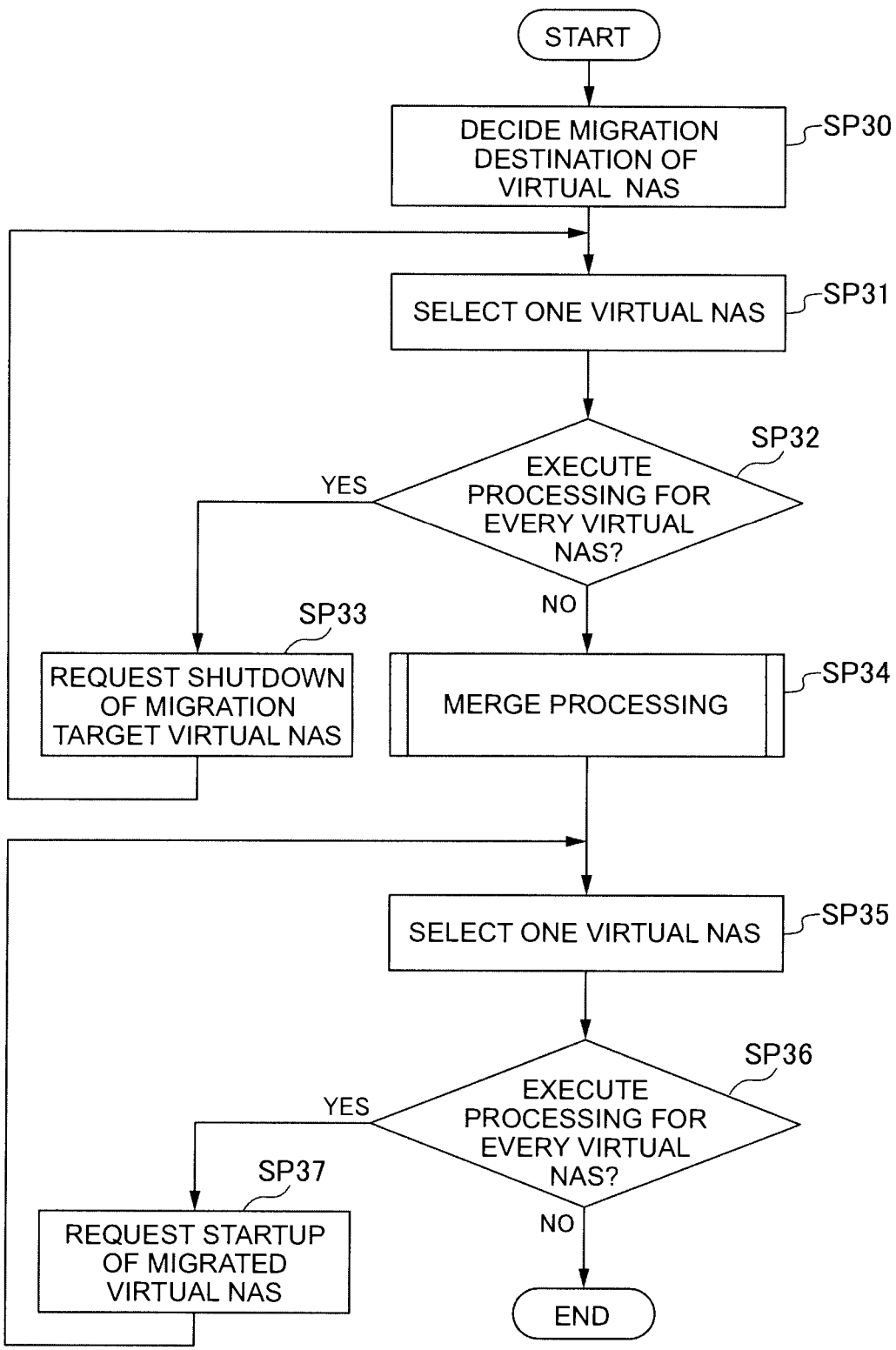
FIG. 21 is a flowchart showing a processing routine of virtual NAS migration control processing.

Meanwhile, FIG. 21 shows the processing routine of the virtual NAS migration control processing to be executed by the virtual NAS migration control program 71 that was started up at step SP27 of the foregoing virtual NAS degree of contribution calculation processing (FIG. 20).

When the virtual NAS migration control program 71 is started up by the virtual NAS degree of contribution calculation processing program 70, it starts the virtual NAS migration control processing shown in FIG. 21, and foremost verifies the migration target virtual NAS 53 and the migration destination NAS server 11, and decides the migration destination of the virtual NAS 53 (SP30). Moreover, the virtual NAS migration control program 71 selects one migration target virtual NAS 53 (SP31), and thereafter determines whether the processing at step SP33 was executed to all virtual NASes 53 (SP32).

If the virtual NAS migration control program 71 obtains a negative result in this determination, it sends a shutdown request to the virtual NAS management program 51 of the NAS server 11 on which the migration target virtual NAS 53 is running for shutting down the operation of such migration target virtual NAS 53 (SP33), and thereafter returns to step SP31.

The virtual NAS migration control program 71 thereafter repeats the processing of step SP31 to step SP33 while sequentially selecting a different virtual NAS 53 at step SP31. Consequently, the virtual NAS migration control program 71 sequentially shuts down the operation of each migration target virtual NAS 53 to which the NAS name and the like were delivered from the virtual NAS degree of contribution calculation processing program 70 at step SP27 of the virtual NAS degree of contribution calculation processing.

When the virtual NAS migration control program 71 eventually obtains a positive result at step SP32 as a result of shutting down the operation of all migration target virtual NASes 53, and there are a plurality of virtual NAS 53 that can be merged among the migration target virtual NASes 53 and the virtual NASes 53 existing in the migration destination NAS server 11, it merges such virtual NASes 53 (SP34).

Subsequently, the virtual NAS migration control program 71 selects one virtual NAS 53 among the virtual NASes 53 as the migration destination candidate decided at step SP26 of the virtual NAS degree of contribution calculation processing (FIG. 20) (SP35), and thereafter determines whether the processing of step SP37 can be executed regarding all virtual NASes 53 as the migration destination candidate decided at step SP26 of the virtual NAS degree of contribution calculation processing (SP36).

If the virtual NAS migration control program 71 obtains a negative result in this determination, it sends a start-up request to the virtual NAS management program 51 (FIG. 2) of the migration destination NAS server 11 for sending starting up the virtual NAS 53 that was migrated to the NAS server 11 (SP37), and thereafter returns to step SP35.

The virtual NAS migration control program 71 thereafter repeats the processing of step SP35 to step SP37 while sequentially selecting a different virtual NAS 53 at step SP35. Consequently, the virtual NAS migration control program 71 sequentially starts up each migration target virtual NAS 53 in the migration destination NAS server 11.

When the virtual NAS migration control program 71 eventually obtains a positive result at step SP36 as a result of completing the startup of all migration target virtual NASes 53 on the migration destination NAS server 11, it ends this virtual NAS migration control processing.

Here, the specific processing contents of the merge processing to be executed at step SP34 of the virtual NAS migration control processing are now explained.

Figure 22A:
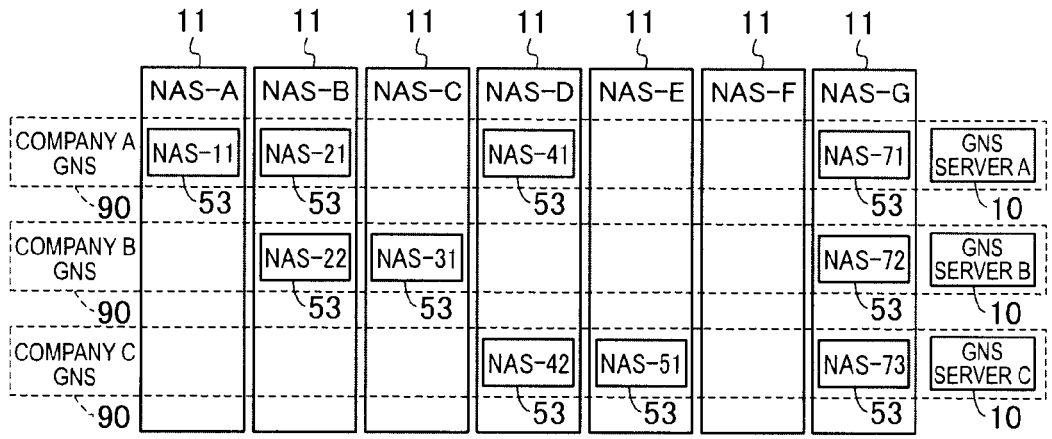
FIG. 22A to FIG. 22C are conceptual diagrams explaining the merge of virtual servers.
Figure 22B:
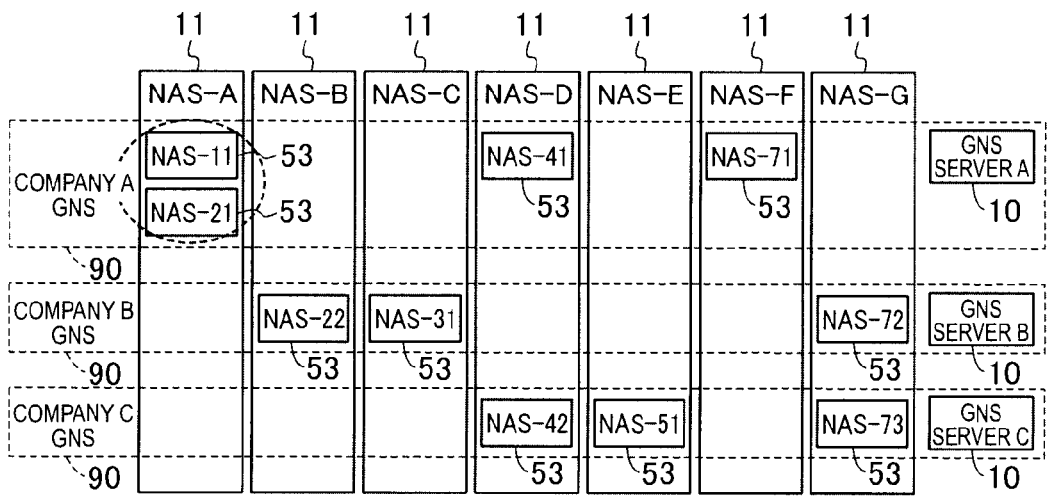
Figure 22C:
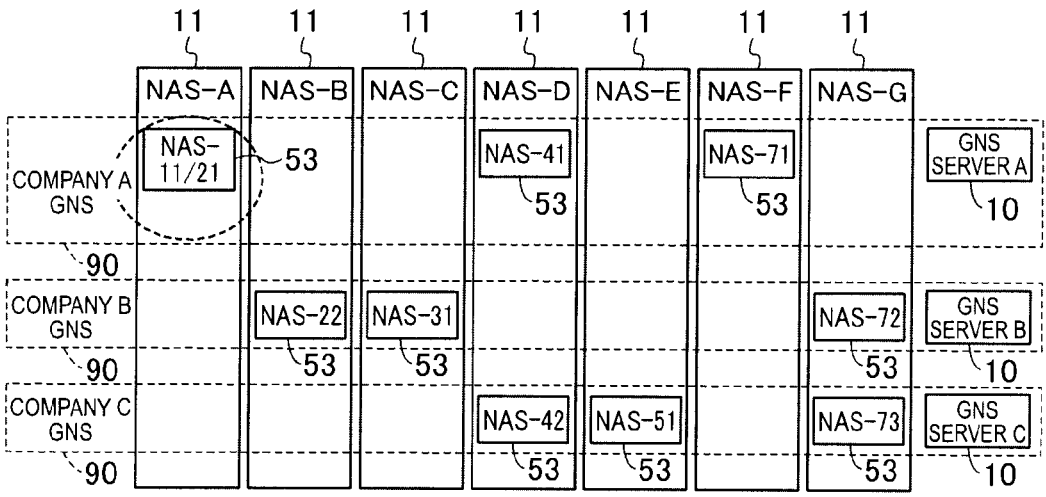

As shown in FIG. 22A to FIG. 22C, for example, when the virtual NAS 53 of "NAS-21" that was running on the NAS server 11 of "NAS-B" is to be migrated to the NAS server 11 of "NAS-A," it can be merged with the virtual NAS 53 of "NAS-11" that was previously existing in the same GNS 90 as "NAS-21," and, consequently, the utilization efficiency of the virtual NAS 53 (and ultimately the NAS server 11) can be improved.

FIG. 23 shows the specific processing contents of the merge processing to be executed at step SP34 of the virtual NAS migration control processing (FIG. 21).

When the virtual NAS migration control program 71 proceeds to step SP34 of the virtual NAS migration control processing, it starts this merge processing, and foremost acquires the various types of information concerning the resources (IP address, operating frequency and memory capacity of the CPU, etc.) of all migration target virtual NASes 53 in which the operation was shut down based on the loop processing of step SP31 to step SP33 (SP40). This information was provided by the virtual NAS degree of contribution calculation processing program 70 at step SP27 of the virtual NAS degree of contribution calculation processing (FIG. 20).

Subsequently, the virtual NAS migration control program 71 searches for a virtual NAS 53 that is running in the migration destination NAS server 11 from the NAS-based virtual NAS list table 81 (FIG. 12) (SP41), and determines whether there is a virtual NAS 41 that is in operation based on the search result (SP42).

If the virtual NAS migration control program 71 obtains a negative result in this determination, it ends this merge processing and returns to the virtual NAS migration control processing (FIG. 21), and, if the virtual NAS migration control program 71 obtains a positive result, it refers to the GNS-based NAS list table 80 (FIG. 11), and determines whether the migration target virtual NAS 53 and the virtual NAS 53 that was detected in the search at step SP41 belong to the same GNS 90 (SP43).

If the virtual NAS migration control program 71 obtains a negative result in this determination, it ends this merge processing and returns to the virtual NAS migration control processing (FIG. 21). Meanwhile, if the virtual NAS migration control program 71 obtains a positive result, it merges the migration target virtual NAS 53 and the virtual NAS 43 that was detected at step SP41 (SP44). This merge is performed by integrating the resources of the two virtual NASes 53 to be merged (integrating the resources in the management table (not shown) for managing the resources of the virtual NAS 53). The virtual NAS migration control program 71 thereafter ends this merge processing and returns to the virtual NAS migration control processing.

(2-3-3) Virtual NAS Migration Control Processing

Figure 24:
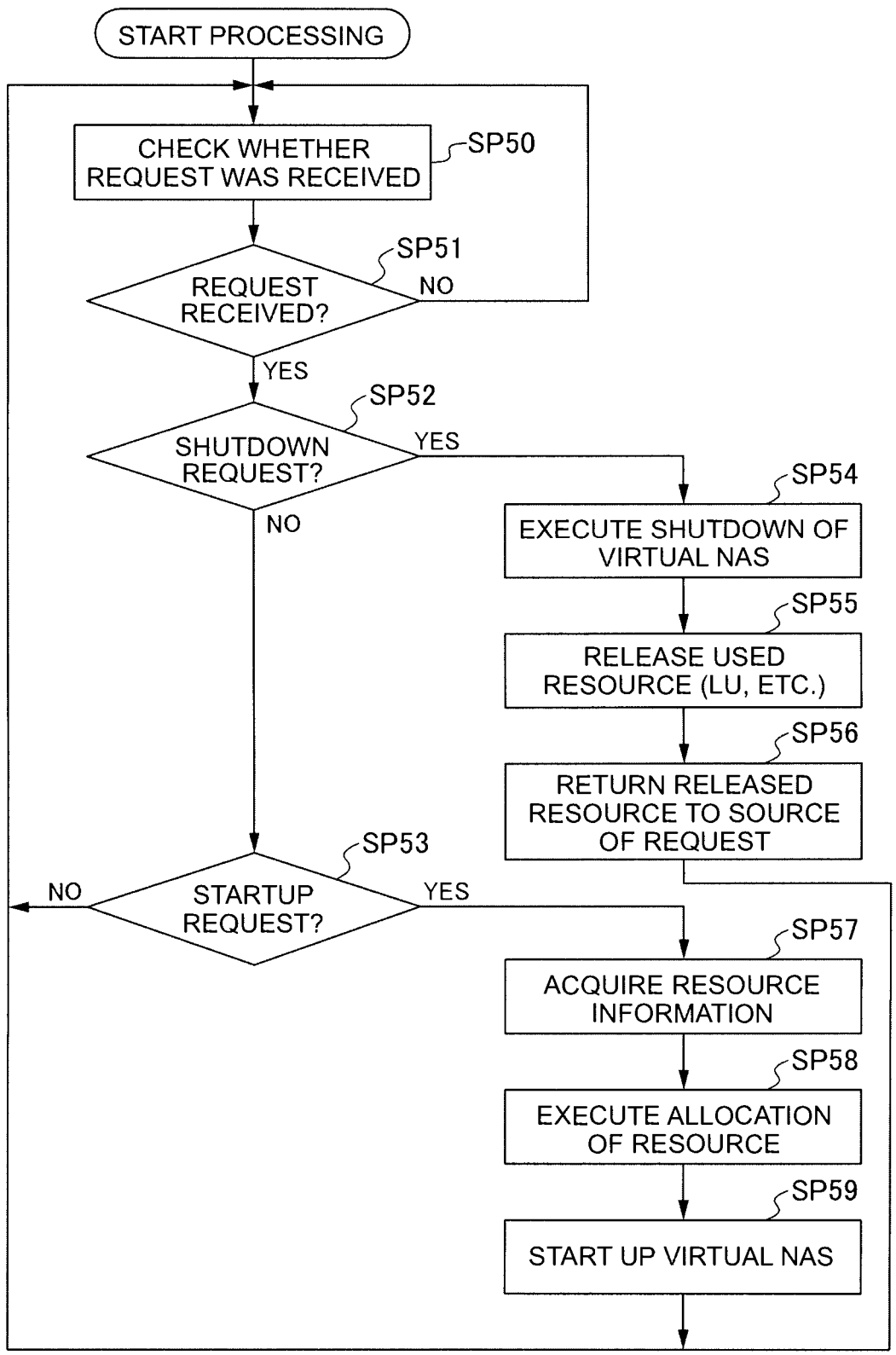
FIG. 24 is a flowchart showing a processing routine of virtual NAS migration control processing.

Meanwhile, FIG. 24 shows the processing routine of the virtual NAS management processing to be executed by the virtual NAS management program 51 (FIG. 2) of the NAS server 11 in relation to the startup and shutdown of the operation of the virtual NAS 53.

After starting up the virtual NAS 53, the virtual NAS management program 51 starts this virtual NAS management processing, and foremost checks whether there is a request form the management server 12 (SP50), and determines whether any kind of request was received from the management server 12(SP51). If the virtual NAS management program 51 obtains a negative result in this determination, it returns to step SP50.

Meanwhile, if the virtual NAS management program 51 obtains a positive result in this determination, it determines whether that request is a shutdown request (SP52), and, if the virtual NAS management program 51 obtains a negative result, it determines whether that request is a start-up request (SP53). If the virtual NAS management program 51 obtains a negative result in this determination, it returns to step SP50, and repeats the same processing until it obtains a positive result at step SP52 or step SP53.

When the virtual NAS management program 51 eventually obtains a positive result at step SP52 as a result of receiving a shutdown request of any one of the virtual NASes 53 from the management server 12, it executes the shutdown of the virtual NAS 53 designated in the shutdown request (SP54), and releases the resources such as the CPU, memory, logical volume and the like that were being used by that virtual NAS 53 (SP55). Moreover, in order to prevent the released resources from being allocated to the other virtual NASes 53, the virtual NAS management program 51 returns those resources to the management server 12 as the source of request of the shutdown request (SP56). Incidentally, these resources are subsequently allocated to the virtual NAS 53 to be started up after being migrated at step SP58. The virtual NAS management program 51 thereafter returns to step SP50.

Meanwhile, when the virtual NAS management program 51 eventually obtains a positive result at step SP53 as a result of receiving a start-up request of any one of the virtual NASes 53 from the management server 12, it acquires, from such start-up request, the resource information (resource information of the resources returned to the management server 12 at step SP56) of the virtual NAS 53 designated in that start-up request (SP57), allocates the resources to that virtual NAS 53

(SP58), and thereafter starts up that virtual NAS 53 (SP59). The virtual NAS management program 51 thereafter returns to step SP50.

(3) Effect of Present Embodiment

As described above, since the computer system 1 according to this embodiment selects the migration target virtual NAS 53 and the migration destination virtual NAS 53 so as to average, among the NAS servers 11, the total value of the virtual NAS degrees of contribution of the respective virtual NASes 53 that are running on the NAS servers 11 based on the virtual NAS degree of contribution for each virtual NAS 53, and migrates the virtual NAS 53 decided as the migration target to the NAS server 11 decided as the migration destination, it is possible to prevent a plurality of virtual NASes 53 respectively having a high virtual NAS degree of contribution and belonging to a different GNS 90 from being concentrated on one NAS server 11. Consequently, it is possible to localize influence from a failure of one NAS server 1 and prevent influence from the NAS server 11 failure from spreading.

(4) Other Embodiments

Incidentally, although the foregoing embodiment explained a case of using the management server 12 as a management apparatus for managing the virtual NASes 53 and configuring the degree of contribution calculation processing unit for calculating the degree of contribution (virtual NAS degree of contribution) to the user for each virtual NAS 53 from the virtual NAS degree of contribution calculation processing program 70 and the CPU 24, and configuring the migration control unit for executing the control of averaging, among the NAS servers 11, the total value of the virtual NAS degrees of contribution of the respective virtual NASes 53 that are running on the NAS servers 11 based on the virtual NAS degree of contribution for each virtual NAS 53, and migrating the virtual NAS 53 decided as the migration target to the NAS server 11 decided as the migration destination from the virtual NAS migration control program 71 and the CPU 24, and the present invention is not limited thereto, and the degree of contribution calculation processing unit and the migration control unit may also be of a hardware configuration.

Moreover, although the foregoing embodiment explained a case of providing three GNS servers 10 and seven NAS servers 11 in the computer system 1, the present invention is not limited thereto, and the present invention can be applied regardless of the number of GNS servers 10 and the NAS servers 11.

In addition, although the foregoing embodiment explained a case of extracting a NAS server 11 in which the GNS multiplicity is "2" or greater at step SP23 and to extract a NAS server 11 in which the GNS multiplicity is "1" or less at step SP25 of the virtual NAS degree of contribution calculation processing explained with reference to FIG. 20, the present invention is not limited thereto, and the GNS multiplicity of the NAS server 11 to be extracted at step SP23 or step SP25 may be decided according to the number of GNS servers 10, and may be a number other than "2" or "1."

The present invention can be broadly applied to computer systems comprising a plurality of NAS servers.

What is claimed is:

1. A computer system, comprising:
one or more servers configured to respectively provide a plurality of single namespaces, different from one another to a client;
a plurality of physical nodes configured to execute a plurality of virtual nodes that respectively belong to one of the plurality of single namespaces and provide a file sharing service to the client; and
a management apparatus for managing the virtual nodes;
wherein the management apparatus comprises:
a degree of contribution calculation processing unit configured to calculate a degree of contribution to a user for each of the virtual nodes; and
a migration control unit configured to:
select the virtual node to be migrated and the physical node of a migration destination so as to average, among two or more of the plurality of physical nodes, a total value of the degree of contribution of each of the virtual nodes running on the physical nodes based on the degree of contribution to the user for each of the virtual nodes;
migrate the virtual node selected as a migration target to the physical node selected as the migration destination;
select the virtual node to be migrated among the virtual nodes running on the physical nodes in which the total value of the degree of contribution of each of the virtual nodes in operation is greater than an average value of the total value in all of the physical nodes and in which dispersion of the degree of contribution for each of the virtual nodes in operation is smallest;
calculate a multiplicity of the single namespace in each of the physical nodes;
select more than one physical node that comprises the multiplicity higher than a threshold value;
determine, for the selected physical nodes, a plurality of average values associated with a degree of contribution of the virtual nodes that belong to the physical node; and
select, between the selected physical nodes, a physical node that comprises:
a highest average value of degrees of contribution of the virtual nodes that belong to the physical node; and
a smallest dispersion of degrees of contribution of respective virtual nodes that belong to the physical node;
wherein,
when the virtual node belonging to the same single namespace as the migration target virtual node is running on the migration destination physical node, the migration control unit is configured to merge the migration target virtual node and the virtual node running on the migration destination physical node; and
when the virtual node belonging to a different single namespace as the migration target virtual node is running on the migration destination physical node, the migration control unit is configured not to merge the migration target virtual node and the virtual node running on the migration destination physical node.

2. The computer system according to claim 1, wherein the degree of contribution calculation processing unit is configured to calculate the degree of contribution based on a score of each of a plurality of predetermined evaluation items.

3. The computer system according to claim 2, wherein the evaluation items include at least one among a number of links to a file that is being managed in the virtual node, a number of users to access the virtual node, a number of shared directories provided by the virtual node, and a number of files reproduced in the client.

4. The computer system according to claim 1, wherein the migration control unit is configured to select the migration destination physical node of the virtual node based on the multiplicity and the degree of contribution of each of the virtual servers.

5. The computer system according to claim 1, wherein the migration control unit is configured to select the migration destination physical node of the virtual node based on configuration information of the physical node.

6. A management method of managing virtual nodes that are running on a plurality of physical nodes capable of executing a plurality of virtual nodes that provide a file sharing service to a client, wherein the virtual nodes respectively belong to a plurality of single namespaces which are different from each other; wherein the management method comprises:
   calculating a degree of contribution to a user for each of the virtual nodes; and
   selecting the virtual node to be migrated and the physical node of a migration destination so as to average, among two or more of the physical nodes, a total value of the degree of contribution of each of the virtual nodes running on the physical nodes based on the degree of contribution to the user for each of the virtual nodes;
   migrating the virtual node selected as the migration target to the physical node selected as the migration destination;
   selecting the virtual node to be migrated among the virtual nodes running on the physical nodes in which the total value of the degree of contribution of each of the virtual nodes in operation is greater than an average value of the total value in all of the physical nodes and in which a dispersion of the degree of contribution for each of the virtual nodes in operation is smallest;
   calculating a multiplicity of each physical node;
   selecting more than one physical node that comprises the multiplicity higher than a threshold value;
   determining for the selected physical nodes, a plurality of average values associated with a degree of contribution of the virtual nodes that belong to the physical node; and
   selecting, between the selected physical nodes, a physical node that comprises:
      a highest average value of the degrees of contribution of the virtual nodes that belong to the physical node; and
      a smallest dispersion of degrees of contribution of respective virtual nodes that belong to the physical node;
   wherein,
      when the virtual node belonging to the same single namespace as the migration target virtual node is running on the migration destination physical node, merging the migration target virtual node and the virtual node running on the migration destination physical node; and
      when the virtual node belonging to a different single namespace as the migration target virtual node is running on the migration destination physical node, not merging the migration target virtual node and the virtual node running on the migration destination physical node.

7. The management method according to claim 6, wherein the degree of contribution is calculated based on a score of each of a plurality of predetermined evaluation items.

8. The management method according to claim 7, wherein the evaluation items include at least one among a number of links to a file that is being managed in the virtual node, a number of users to access the virtual node, a number of shared directories provided by the virtual node, and a number of files reproduced in the client.

9. The management method according to claim 6, wherein the migration destination physical node of the virtual node is selected based on the multiplicity and the degree of contribution of each of the servers.

10. The management method according to claim 6, wherein the migration destination physical node of the virtual node is selected based on configuration infoiniation of the physical node.

* * * * *